United States Patent

[11] 3,613,868

| [72] | Inventors | Calvin P. Rickerd<br>La Grange Park;<br>Tommy A. Middlesworth, Hinsdale, both of Ill. |
|---|---|---|
| [21] | Appl. No. | 61,296 |
| [22] | Filed | Aug. 5, 1970 |
| [45] | Patented | Oct. 19, 1971 |
| [73] | Assignee | International Harvester Company<br>Chicago, Ill. |

[54] CONVEYOR WHEEL
7 Claims, 2 Drawing Figs.

[52] U.S. Cl. .................................................. 198/211,
214/356, 302/49
[51] Int. Cl. ................................................. B65g 29/00
[50] Field of Search .......................................... 198/25,
211; 302/49; 294/19 A; 214/356; 56/328, 329

[56] References Cited
UNITED STATES PATENTS

| 2,658,637 | 11/1953 | Bailey .......................... | 214/356 |
| 2,729,046 | 1/1956 | Patterson ..................... | 214/356 |
| 2,810,487 | 10/1957 | Bailey .......................... | 214/356 |
| 3,272,309 | 9/1966 | Reading ....................... | 198/25 |

Primary Examiner—Andres H. Nielsen
Attorney—Floyd B. Harman

ABSTRACT: A rotatable conveyor wheel adapted for moving articles such as fruit or the like. The conveyor wheel includes a hub rotatable about a fixed axis disposed above a surface along which the articles are to be moved. The outer periphery of the wheel is defined by annular resilient cushions which are yieldably engageable with the articles to move the same along the surface. The annular cushions are mounted on a rim which is connected about the hub by a plurality of resilient spokes. By this arrangement, the rim and cushions may move relative to the fixed axis of rotation to accommodate articles of a variety of sizes or variable volumes of articles.

PATENTED OCT 19 1971

3,613,868

INVENTORS
CALVIN P. RICKERD
TOMMY A. MIDDLESWORTH
BY Neal C. Johnson ATT'Y.

CONVEYOR WHEEL

BACKGROUND OF THE INVENTION

1. Field of the Invention

The invention relates generally to conveyors for moving articles along a surface and more particularly to a rotatable conveyor wheel particularly adapted for moving articles such as fruit or the like in varying volumes or of a variety of sizes.

2. Prior Art

Conveying articles along a surface through a space limited in size presents several problems, particularly where the volume or number of articles is variable or where the individual articles vary in size. A typical solution is to support the conveyor in a manner wherein it is capable of moving as a unit relative to the surface on which the articles are moved. In a rotary-type conveyor, this involves designing the supports to accommodate shifting movement. Moreover, a power drive system for the conveyor will likewise have to be designed to accommodate this movement. The result can be a relatively complex and expensive arrangement.

When the articles to be conveyed consist of fruit such as oranges, for example, another problem is to convey and handle the fruit in as high a volume and as quickly as possible while minimizing bruising and cutting.

SUMMARY

The invention provides a rotary conveyor for moving articles along a surface. The conveyor includes a wheel having a central hub and an annular rim about which a resilient cushion is disposed to define a periphery of the wheel in spaced relation to the surface. The cushion is yieldably engageable with the articles to propel the same along the surface. The rim is connected to the hub by a plurality of resilient spokes which permit the rim to shift relative to the hub and, thus, accommodate articles of a variety of sizes or in varying volumes.

The conveyor eliminates the need for supports which permit shifting movement of the entire conveyor, with the consequent savings in cost as compared with fixed supports. Moreover, the drive system does not have to be designed to accommodate shifting. The resilient cushion defining the article-engaging periphery of the conveyor serves to move the articles with a minimum of damage thereto.

Briefly the objects of the invention are to provide a rotary conveyor which readily accommodates varying volumes of articles and articles of a variety of sizes; handles articles such as fruit and the like with a minimum of damage; and which is simple and economical in design, manufacture and installation.

DESCRIPTION OF THE PREFERRED EMBODIMENT

Figure 1:
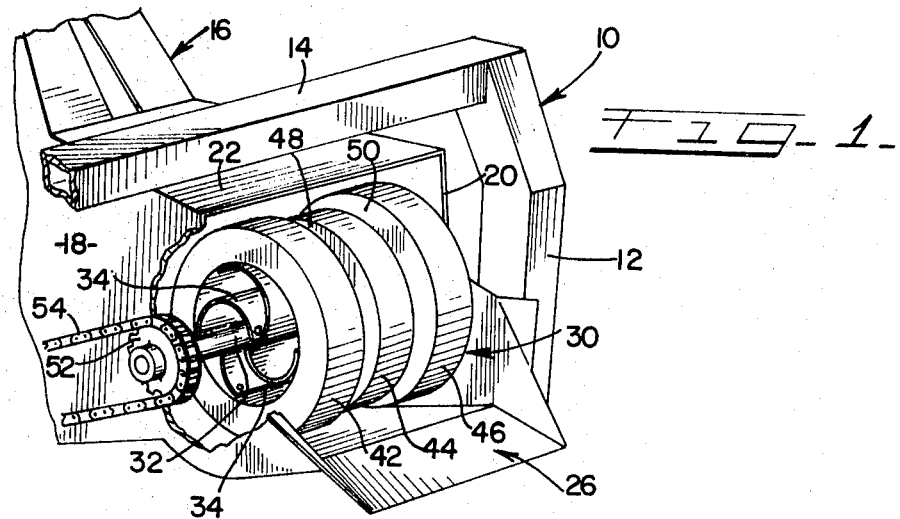
FIG. 1 is a fragmentary perspective view of the conveyor wheel of the invention; and, FIG. 2 is an enlarged side elevation view partly in cross section of the conveyor wheel of the invention.

Referring first to FIG. 1, there is shown a portion of the framework 10 of a fruit harvester such as shown in greater detail in copending application, Ser. No. 867,103 filed Oct. 16, 1969 for FRUIT CATCHER AND CONVEYOR SYSTEM. The framework includes a vertical portion 12 and a horizontal portion 14. An elevator shown partially at 16 is secured by suitable means to the horizontal portion 14 of the framework for conveying fruit upwardly to a collection bin (not shown) generally similar to the bin shown at 28 in the above-noted patent application. The elevator 16 may be of the type shown at 184 in the copending patent application and includes a plurality of flights, one of which being partially shown at 17, similar to the flight shown at 258 in the copending application. The elevator 16 includes a pair of sidewalls 18 and 20 interconnected by a top wall 22 and a bottom wall 24 which, together, define an entrance through which fruit is conveyed into the elevator. A chute 26 extends forwardly from the entrance to the elevator 16 and includes a bottom wall 28 connected to the bottom wall 24 of the elevator.

Figure 2:
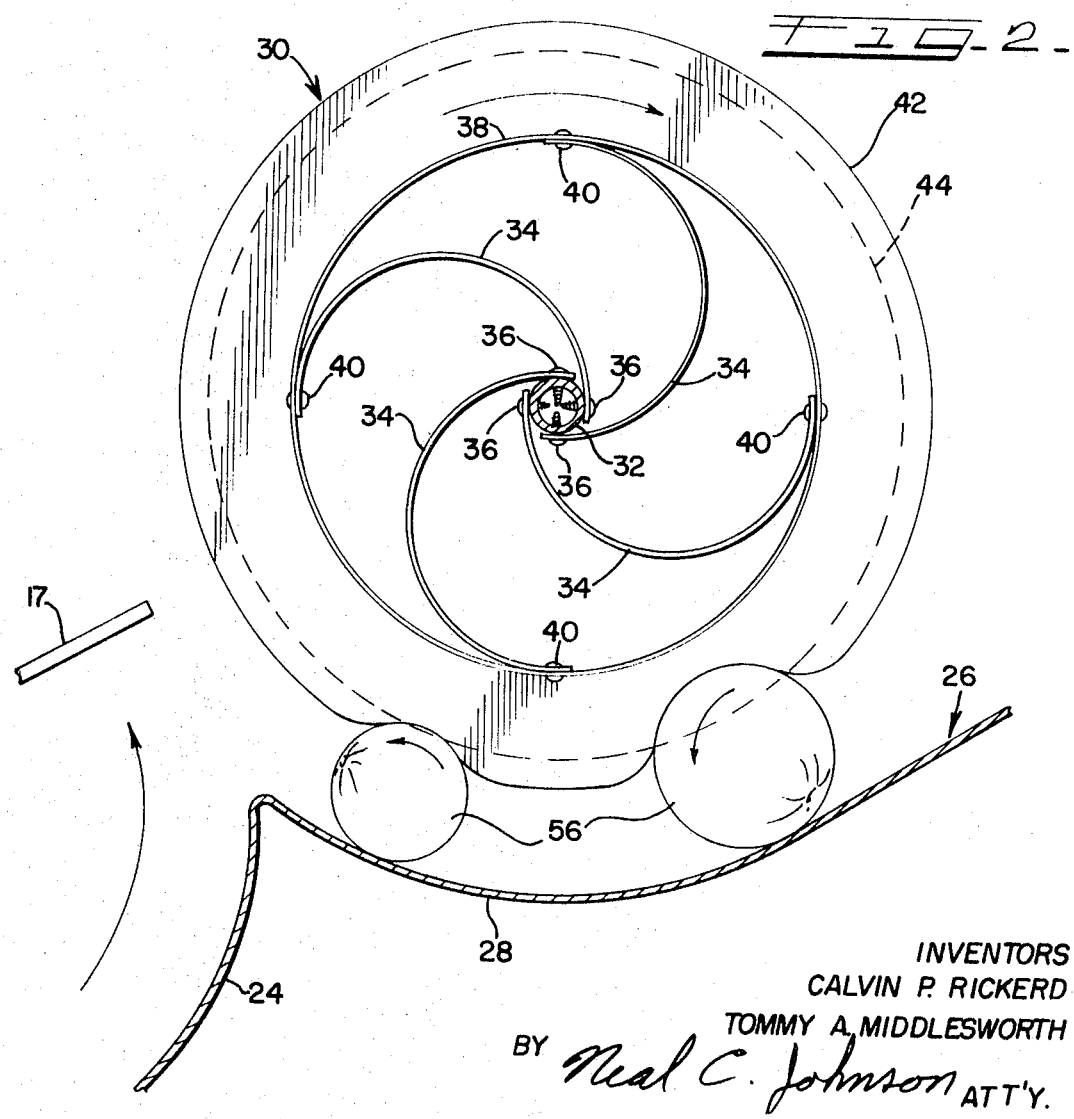

In accordance with the invention, a conveyor wheel 30 is disposed across the entrance of the elevator 16 for controlled feeding of fruit into the elevator. The fruit may be delivered into the chute 26 by a conveyor system such as shown at 182 in the copending patent application. The conveyor wheel 30 includes a central shaft or hub 32 defining the axis of rotation of the wheel. The shaft 32 is journaled by suitable bearings (not shown) in the sidewalls 18 and 20 so as to be horizontally disposed in fixed position relative to the associated structure of the device. A plurality of flexible resilient spokes 34 are secured to the shaft 32 by screws 36 as best shown in FIG. 2. An annular rim 38 is connected to the outer ends of the spokes 34 by fasteners 40.

It will be seen that each of the spokes 34 comprises a generally semicylindrical member defined about an axis extending parallel to the shaft 32. It will, of course, be apparent that each spoke 34 extends longitudinally of the shaft 32 a distance less than that between the sidewalls 18 and 20. As seen in the end view of FIG. 2, the semicylindrical configuration of each spoke 34 defines a path curving inwardly from the rim 38 toward the shaft 32 in the clockwise direction of rotation of the conveyor. It will be understood that the rim 38 comprises a cylindrical member of flexible metallic material disposed concentrically about the shaft 32 and extends a length substantially the same as that of the spokes 34.

In accordance with a further feature of the invention, the periphery of the conveyor wheel 30 is defined by resilient cushioning means for yieldably engaging the articles being conveyed and in a manner wherein bruising or cutting of the articles is minimized. In the illustrated embodiment, annular cushions 42, 44 and 46 are secured by adhesives around the rim 38. The cushions 42 through 46 are preferably formed of sponge rubber and are disposed on the rim 38 in spaced relation to define annular spaces 48 and 50 about the rim 38. The centrally disposed cushion 44 is preferable slightly less in diameter than the adjacent cushions 42 and 46.

The conveyor wheel 30 is adapted to be driven by a simple drive system. A sprocket 52 is fixed on the shaft 32 and a chain 54 connects the sprocket 52 to a suitable power source.

In operation, the articles, such as oranges, shown at 56 in FIG. 2, are delivered to the chute 26. As the conveyor wheel is rotated the oranges are engaged by the cushions 42 through 46 and rollably conveyed along the surface 28 toward the flights 17 of the elevator. The annular spaces 48 and 50 together with the slightly decreased diameter of the central cushion 44, assist in directing or channeling the fruit centrally beneath the conveyor wheel. In the event the volume of fruit delivered to the chute 26 suddenly increases, it will be seen that the resiliency and shape of the spokes 34 will permit the rim and cushions to shift upwardly relative to the shaft 32 and surface 28. Accordingly, the increased volume of fruit is accommodated without the necessity that the entire conveyor and its drive system be shiftably supported. The same effect will be realized where relatively large individual oranges are encountered.

From the foregoing, it will be seen that the invention provides a simple and effective conveyor particularly well adapted for the stated purposes.

What is claimed is:

1. A rotary conveyor for moving articles along a surface, comprising: a wheel mounted for rotation adjacent said surface, said wheel having a hub defining the axis of rotation of the wheel, a rim portion including resilient cushioning means defining a periphery of the wheel in spaced relation to said surface, said cushioning means being yieldably engageable with the articles to move the same along said surface as the wheel is rotated, and resilient spokes connected between said hub and said rim portion permitting said rim portion to shift relative to said surface to accommodate articles therebetween of a variety of sizes.

2. The subject matter of claim 1, wherein each of said spokes extends from said rim portion to said hub along a curvilinear path.

3. The subject matter of claim 2, wherein said path extends from said rim portion to said hub inwardly and forwardly in the direction of rotation of said wheel.

4. The subject matter of claim 1, wherein each of said spokes comprises a flexible member extending between said rim portion and said hub along a curved path extending inwardly toward said hub in the direction of rotation of said wheel.

5. The subject matter of claim 1, wherein said wheel is mounted above said surface and said axis of rotation is fixed in a substantially horizontal plane.

6. The subject matter of claim 1, wherein each of said spokes comprises a generally semicylindrical member defined about an axis extending parallel to the axis of rotation of said wheel.

7. The subject matter of claim 1, wherein said cushioning means includes a plurality of annular cushions mounted on said rim portion in spaced relation to define annular spaces between said cushions.